US010489013B2

(12) United States Patent
Chen et al.

(10) Patent No.: US 10,489,013 B2
(45) Date of Patent: Nov. 26, 2019

(54) INTELLIGENT TASKBAR SHORTCUT MENU FOR WEBPAGE CONTROL

(71) Applicant: International Business Machines Corporation, Armonk, NY (US)

(72) Inventors: Hsiao-Yung Chen, New Taipei (TW); Andy Min-Tsung Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 14/659,649

(22) Filed: Mar. 17, 2015

(65) Prior Publication Data
US 2016/0274777 A1    Sep. 22, 2016

(51) Int. Cl.
*G06F 3/0482* (2013.01)

(52) U.S. Cl.
CPC .................... *G06F 3/0482* (2013.01)

(58) Field of Classification Search
CPC ..................... G06F 3/04847; G06F 3/0482
See application file for complete search history.

(56) References Cited

U.S. PATENT DOCUMENTS

| | | | | |
|---|---|---|---|---|
| 6,072,486 A * | 6/2000 | Sheldon | ............... | G06F 3/0481 715/835 |
| 6,278,448 B1 * | 8/2001 | Brown | ................. | G06F 3/0481 715/866 |
| 6,756,999 B2 * | 6/2004 | Stoakley | .............. | G06F 3/0481 715/764 |

(Continued)

FOREIGN PATENT DOCUMENTS

CN    1786906 A    6/2006
CN    101057209 A    10/2007
(Continued)

OTHER PUBLICATIONS

Evernote, "How to use Evernote Web Clipper," Web Clipper Guide, Copyright 2015 Evernote Corporation, p. 1-14, https://evernote.com/webclipper/guide/, Accessed on Mar. 12, 2015.

(Continued)

*Primary Examiner* — Ryan F Pitaro
*Assistant Examiner* — Jeremy L Stanley
(74) *Attorney, Agent, or Firm* — Erik K. Johnson

(57) ABSTRACT

A method for controlling a plurality of application content based on a taskbar shortcut menu is provided. The method may include defining control component tags in a plurality of applications. The method may also include identifying first and second portions of the applications based on the defined control component tags. The method may further include extracting the first and second portions of the applications. Additionally, the method may include generating control menus, and adding the first and second portions of the applications to the control menus. The method may also include displaying a taskbar shortcut menu, including the control menus, whereby the displaying is responsive to detecting a first user action. The method may further include detecting at least one second user action on the second portions of the control menus, whereby the detecting at least one second user action manipulates and controls content associated with the applications.

17 Claims, 10 Drawing Sheets

(56) References Cited

U.S. PATENT DOCUMENTS

| | | | | |
|---|---|---|---|---|
| 7,665,031 | B2* | 2/2010 | Matthews | G06F 3/0481 715/753 |
| 7,757,182 | B2* | 7/2010 | Elliott | G06F 9/4443 715/716 |
| 7,882,448 | B2* | 2/2011 | Haug | G06F 3/0486 715/779 |
| 8,225,195 | B1* | 7/2012 | Bryar | G06F 17/30905 715/200 |
| 8,490,019 | B2* | 7/2013 | Jarrett | G06F 3/04817 715/835 |
| 8,499,254 | B2* | 7/2013 | Sareen | G06F 3/0481 715/779 |
| 8,667,296 | B1* | 3/2014 | Bilinski | G06F 21/46 713/184 |
| 8,671,384 | B2* | 3/2014 | Hilerio | G06F 3/0481 717/100 |
| 9,063,755 | B2* | 6/2015 | Rempell | H04L 51/046 |
| 9,177,298 | B2* | 11/2015 | Haynes | G06F 3/0481 |
| 9,648,011 | B1* | 5/2017 | Mattsson | H04L 63/083 |
| 2002/0163545 | A1* | 11/2002 | Hii | G06F 3/0483 715/838 |
| 2004/0268262 | A1* | 12/2004 | Gupta | G06F 9/4443 715/718 |
| 2005/0044058 | A1* | 2/2005 | Matthews | G06F 9/4418 |
| 2005/0097089 | A1* | 5/2005 | Nielsen | G06F 17/30967 |
| 2006/0059422 | A1* | 3/2006 | Wu | G06F 17/30899 715/205 |
| 2006/0123353 | A1* | 6/2006 | Matthews | G06F 3/0481 715/779 |
| 2006/0242602 | A1* | 10/2006 | Schechter | G06F 3/04817 715/838 |
| 2008/0055273 | A1* | 3/2008 | Forstall | G06F 3/04817 345/173 |
| 2008/0120569 | A1* | 5/2008 | Mann | G06F 3/0481 715/792 |
| 2008/0195674 | A1* | 8/2008 | Kim | G06F 17/30899 |
| 2009/0055749 | A1* | 2/2009 | Chatterjee | G06F 3/04817 715/738 |
| 2009/0249355 | A1* | 10/2009 | Kaarela | G06F 17/30994 719/313 |
| 2010/0115450 | A1* | 5/2010 | Scott | G06F 3/0483 715/777 |
| 2011/0029921 | A1* | 2/2011 | Terada | G06F 3/0482 715/810 |
| 2011/0055754 | A1* | 3/2011 | Nicholas, III | G06F 3/0481 715/810 |
| 2011/0113354 | A1* | 5/2011 | Thiyagarajan | G09G 5/14 715/760 |
| 2011/0138295 | A1* | 6/2011 | Momchilov | G06F 9/4445 715/740 |
| 2011/0145360 | A1* | 6/2011 | Sheshagiri | G06F 8/51 709/217 |
| 2011/0173556 | A1* | 7/2011 | Czerwinski | G06F 3/0481 715/771 |
| 2011/0307811 | A1* | 12/2011 | Kim | G06F 8/61 715/760 |
| 2011/0307812 | A1* | 12/2011 | Hilerio | G06F 3/0481 715/760 |
| 2011/0307880 | A1* | 12/2011 | Hilerio | G06F 8/61 717/171 |
| 2011/0307883 | A1* | 12/2011 | Hilerio | G06F 3/0481 717/176 |
| 2012/0226742 | A1* | 9/2012 | Momchilov | G06F 3/1454 709/203 |
| 2012/0296959 | A1* | 11/2012 | Momchilov | G06F 9/54 709/203 |
| 2012/0324338 | A1* | 12/2012 | Meredith | G06F 8/60 715/234 |
| 2013/0103530 | A1* | 4/2013 | Tilford | G06Q 30/08 705/26.3 |
| 2015/0220979 | A1* | 8/2015 | Ouimet | G06Q 30/0633 705/14.49 |
| 2016/0179312 | A1* | 6/2016 | Lam | G06F 3/04817 715/738 |

FOREIGN PATENT DOCUMENTS

| | | |
|---|---|---|
| CN | 102947792 A | 2/2013 |
| CN | 105988670 A | 10/2016 |

OTHER PUBLICATIONS

Hoffman, "How to Turn Web Apps Into First-Class Desktop Citizens," How-To Geek, Mar. 23, 2013, p. 1-7, http://www.howtogeek.com/141431/how-to-turn-web-apps-into-first-class-desktop-citizens/, Accessed on Mar. 12, 2015.

Mell et al., "The NIST Definition of Cloud Computing," National Institute of Standards and Technology, Information Technology Laboratory, Oct. 7, 2009, Version 15.

* cited by examiner

```
<div class="u-cb">
<browser shortcut menu>
  <div class="vi-bbox-dspn u-fl lable pd74 ">Current bid:</div>
</browser shortcut menu>
<div class="g-fl w29 vi-price" itemtype="http://schema.org/Offer" itemscope="itemscope" itemprop="offers">
  <span class="u-dspblk">
  </div>
  <browser shortcut menu>
    <input id="MaxBidId" class="notranslate MaxBid" type="text" value="" name="maxbid" maxlength="10" size="11"/>
  </browser shortcut menu>
</div>
```

Control Component Tags 202

INTELLIGENT TASKBAR SHORTCUT MENU FOR WEBPAGE CONTROL

BACKGROUND

The present invention relates generally to the field of computing, and more specifically, to a taskbar shortcut menu.

Web browsers generally run one or more web-based applications simultaneously. For example, a user can use a computer to open a web browser and access one or more webpages using window tabs within the web browser's user interface. Furthermore, when a web browser window is opened, a web browser window icon is created by the computer's operating system on a taskbar, which is typically located at the bottom of a computer screen. Additionally, when the web browser window is displayed, and not hidden on the taskbar, users can manipulate and control the content on each webpage by individually accessing the window tabs within the web browser window. Also, when the web browser window is minimized and hidden on the taskbar, users can manipulate and control the content on each webpage by selecting the web browser window icon that appears on the taskbar to restore and display the web browser window again. Alternatively, a user can use a mouse to right-click the web browser window icon on the taskbar to open a web browser shortcut menu and can restore and display the web browser window or close the web browser application altogether using the web browser shortcut menu.

SUMMARY

A method for controlling a plurality of application content based on a taskbar shortcut menu is provided. The method may include defining a plurality of control component tags in a plurality of applications. The method may also include identifying a first portion of the plurality of applications based on the plurality of defined control component tags. The method may further include identifying a second portion of the plurality of applications based on the plurality of defined control component tags. Additionally, the method may include extracting the first portion of the plurality of applications and the second portion of the plurality of applications. The method may also include generating a plurality of control menus, and adding the first portion of the plurality of applications and the second portion of the plurality of applications to the plurality of control menus. The method may further include displaying a taskbar shortcut menu, including the plurality of control menus, whereby the displaying is responsive to detecting a first user action. The method may also detecting at least one second user action on the second portion of the plurality of control menus, whereby the detecting at least one second user action manipulates and controls a plurality of content associated with the plurality of applications.

A computer system for controlling a plurality of application content based on a taskbar shortcut menu is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include defining a plurality of control component tags in a plurality of applications. The method may also include identifying a first portion of the plurality of applications based on the plurality of defined control component tags. The method may further include identifying a second portion of the plurality of applications based on the plurality of defined control component tags. Additionally, the method may include extracting the first portion of the plurality of applications and the second portion of the plurality of applications. The method may also include generating a plurality of control menus, and adding the first portion of the plurality of applications and the second portion of the plurality of applications to the plurality of control menus. The method may further include displaying a taskbar shortcut menu, including the plurality of control menus, whereby the displaying is responsive to detecting a first user action. The method may also detecting at least one second user action on the second portion of the plurality of control menus, whereby the detecting at least one second user action manipulates and controls a plurality of content associated with the plurality of applications.

A computer program product for controlling a plurality of application content based on a taskbar shortcut menu is provided. The computer program product may include one or more computer-readable storage devices and program instructions stored on at least one of the one or more tangible storage devices, the program instructions executable by a processor. The computer program product may include program instructions to define a plurality of control component tags in a plurality of applications. The computer program product may also include program instructions to identify a first portion of the plurality of applications based on the plurality of defined control component tags. The computer program product may further include program instructions to identify a second portion of the plurality of applications based on the plurality of defined control component tags. Additionally, the computer program product may include program instructions to extract the first portion of the plurality of applications and the second portion of the plurality of applications. The computer program product may also include program instructions to generating a plurality of control menus, and add the first portion of the plurality of applications and the second portion of the plurality of applications to the plurality of control menus. The computer program product may further include program instructions to display a taskbar shortcut menu, including the plurality of control menus, whereby the displaying is responsive to detecting a first user action. The computer program product may also include to detect at least one second user action on the second portion of the plurality of control menus, whereby the detecting at least one second user action manipulates and controls a plurality of content associated with the plurality of applications.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 illustrates an example of control component tags according to at least one embodiment;

DETAILED DESCRIPTION

Figure 1:
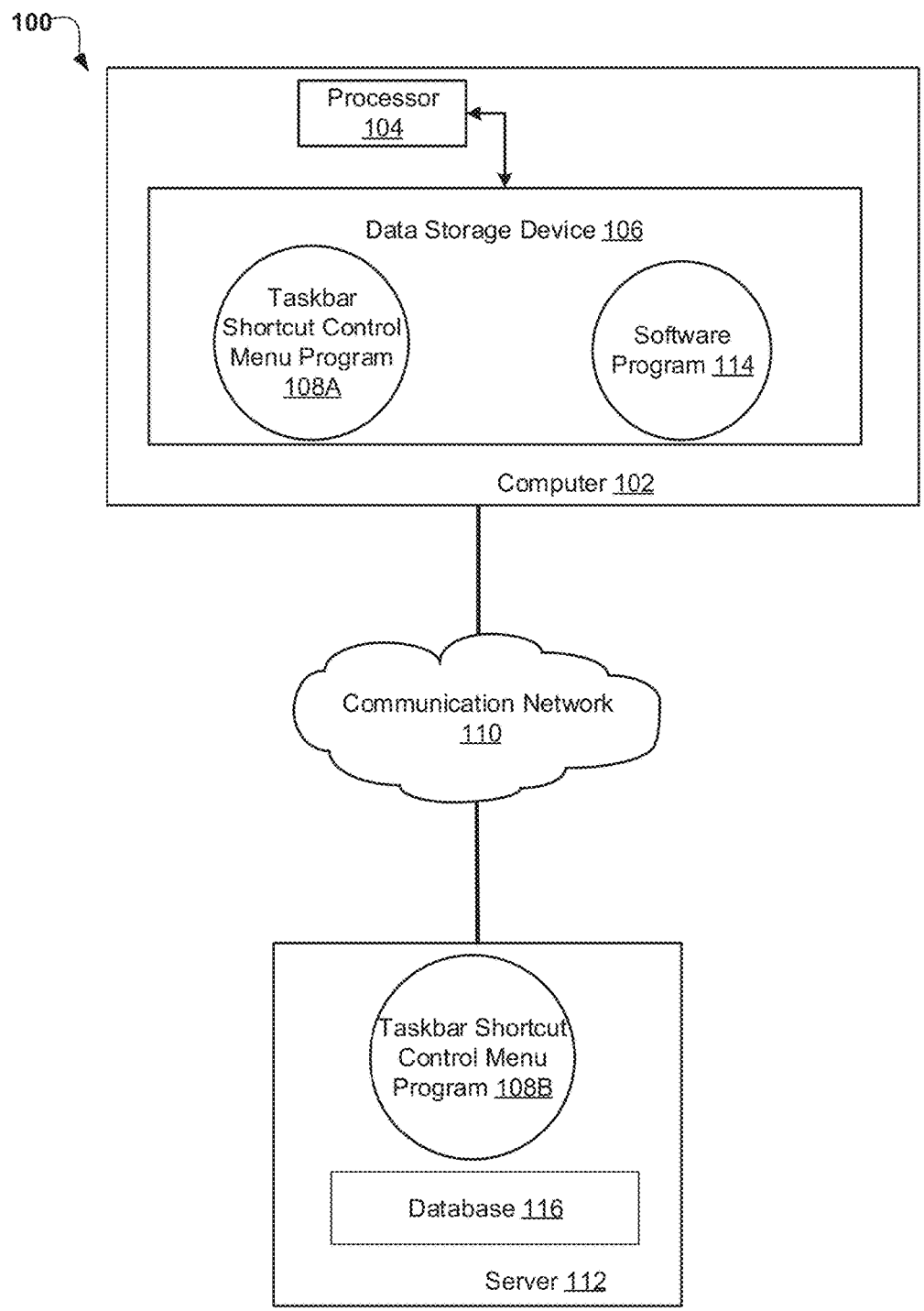
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to a taskbar shortcut menu for webpage control. The following described exemplary embodiments provide a system, method and program product for providing a control menu for manipulating and controlling webpage content from a taskbar shortcut menu. Additionally, the present embodiment has the capacity to improve the technical field of webpage control by allowing a user to control webpage content from a taskbar shortcut menu rather than a web browser window.

As previously described with respect to webpage control, web browsers may run one or more webpage applications simultaneously. For example, a user using a computer may open a web browser application, such as Firefox® (Firefox and all Firefox-based trademarks and logos are trademarks or registered trademarks of Mozilla and/or its affiliates). Thereafter, a Firefox® web browser window may appear on a user's computer screen, and a Firefox® web browser window icon may be created on the taskbar by the computer's operating system. Then, in response to a user clicking on the window tabs within the Firefox® web browser window and entering web addresses, the Firefox® web browser application may open one or more webpages on the one or more window tabs. Current methods may, in turn, allow a user to control webpage content when the web browser window is displayed on the computer screen. However, when the web browser window is not displayed and hidden on the taskbar of the computer's operating system, webpage content cannot be controlled unless the web browser window is restored and displayed on the computer screen. Furthermore, current web browser shortcut menus, which may be displayed in response to a user right-clicking on the web browser window icon on the taskbar, is limited to such actions as re-opening a current webpage session, opening a new webpage session, and closing the web browser window altogether. As such, it may be advantageous, among other things, to provide a taskbar shortcut menu for a web browser that allows a user to control webpage content.

According to at least one embodiment of the present invention, webpage content may be controlled by a taskbar shortcut menu for a web browser. In one embodiment, a web browser window icon may be created on the taskbar of a computer in response to a user opening a web browser application. According to one implementation, a taskbar shortcut menu may be displayed in response to a user right-clicking on the web browser window icon on the taskbar. Furthermore, according to one implementation, the taskbar shortcut menu may display control menus having one or more webpage controls corresponding to the one or more webpages opened by the user in the web browser application. Then, according to one implementation, the one or more control menus in the taskbar shortcut menu may allow a user to control the webpage content of each corresponding webpage application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for providing a taskbar shortcut menu having control menus to control webpage content.

According to at least one implementation, control component tags for a taskbar shortcut menu may be defined in the source code of webpages. As such, the control component tags may be used to define which control components on the webpages may be added to the taskbar shortcut menu to control webpage content. Therefore, a web browser application may be opened, and a corresponding web browser window icon may be created on a taskbar of a computer. Furthermore, the web browser application may open webpages having the pre-defined control component tags in the source code of the webpages. Additionally, display components and control components based on the control component tags may be identified and extracted from the webpages to the taskbar shortcut menu. As such, in response to a user right-clicking on the web browser window icon on the taskbar, control menus corresponding to the webpages in the web browser application may be displayed in the taskbar shortcut menu. Furthermore, control commands initiated by a user's actions may be detected. Thereafter, the control commands may be forwarded from the taskbar shortcut menu of the operating system to the web browser application. Thus, the user may control webpage content using the control menus on the taskbar shortcut menu.

Referring now to FIG. 1, an exemplary networked computer environment 100 in accordance with one embodiment is depicted. The networked computer environment 100 may include a computer 102 with a processor 104 and a data storage device 106 that is enabled to run a taskbar shortcut control menu program 108A and a software program 114. The software program 114 may be an application program such as an internet browser and an email program. The taskbar shortcut control menu program 108A may communicate with the software program 114. The networked computer environment 100 may also include a server 112 that is enabled to run a taskbar shortcut control menu program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 8, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the taskbar shortcut control menu program 108A, 108B may interact with a database 116 that may be embedded in various storage devices, such as, but not limited to a mobile device 102, a networked server 112, or a cloud storage service.

According to the present embodiment, a program, such as a taskbar shortcut control menu program 108A and 108B may run on the client computer 102 or on the server computer 112 via a communications network 110. The taskbar shortcut control menu program 108A, 108B may provide control menus on the taskbar shortcut menu of an operating system, and allow users to control webpage applications using the taskbar shortcut menu. For example, a user using a computer, such as computer 102, may use a software application program 114, such as Firefox®, that interacts with the taskbar shortcut control menu program 108A, 108B, and a database 116, to receive webpages having pre-defined control component tags, and to display a taskbar shortcut menu having control menus to allow users to control webpage content.

Referring now to FIG. 2, an example of control component tags 200 in accordance with one embodiment is depicted. According to one implementation of the present embodiment, the control component tags 202 may be defined in the source code of webpages. Furthermore, according to at least one implementation, the control component tags 202 may be used to define which display components and control components of webpages may be added to webpage control menus on the taskbar shortcut menu. For example, the control component tags 202, <browser shortcut menu>, may be added to the source code of a webpage, such as eBay® (eBay and all eBay-based trademarks and logos are trademarks or registered trademarks of eBay and/or its affiliates). Furthermore, according to at least one implementation, the control component tags 202 may define the display components and the control components of the eBay® webpage to add to a control menu for eBay® on the taskbar shortcut menu.

Figure 3:
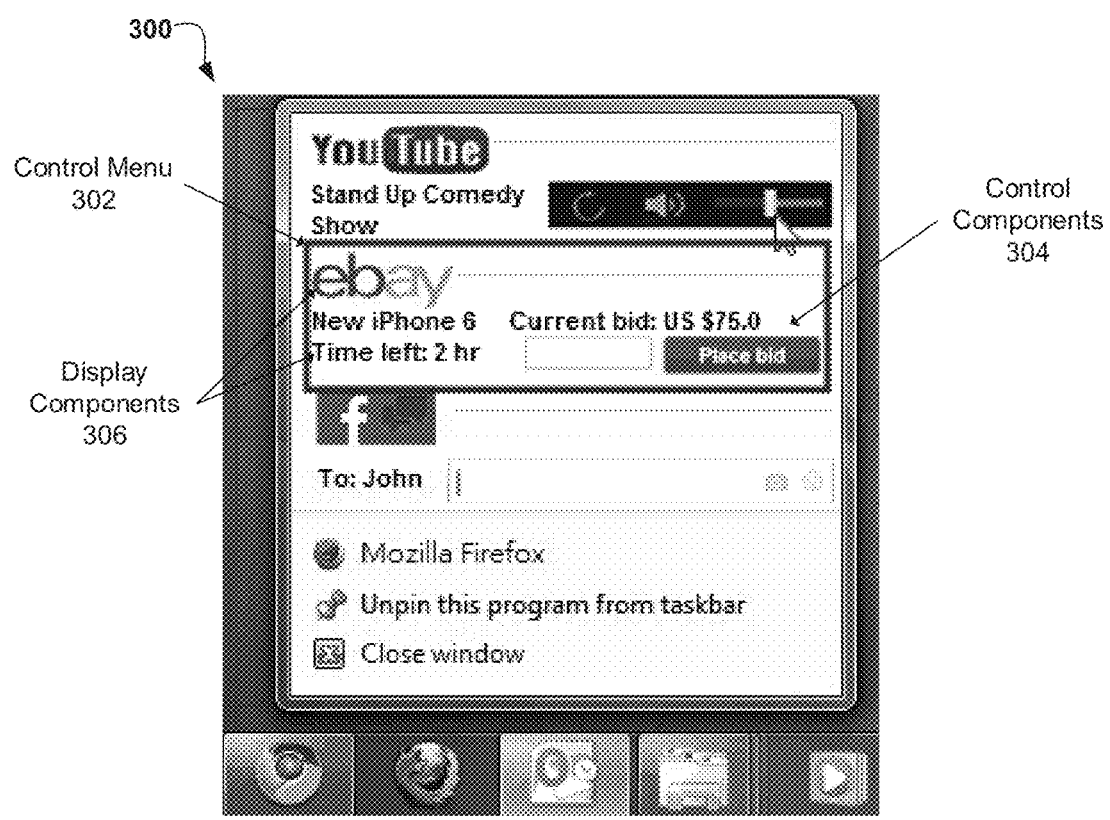
FIG. 3 illustrates an example of a control menu according to at least one embodiment.

Referring now to FIG. 3, an example of a control menu 300 according to one embodiment is depicted. As previously described in FIG. 2, the control component tags 202 (FIG. 2) may be used to define the display components 306 and control components 304 on the webpages to add to the webpage control menus 302. Thus, with respect to the previous example, the control component tags 202 (FIG. 2) may define control components 304 and display components 306 of an eBay® webpage to add to an eBay® control menu 302. Therefore, according to at least one implementation, the control component tags 202 (FIG. 2) may define display components 306, such as the eBay® logo and item information, and control components 304, such as a place bid option, to allow a user to bid on items in the eBay® control menu 302 without having to restore and display a web browser window.

Figure 4:
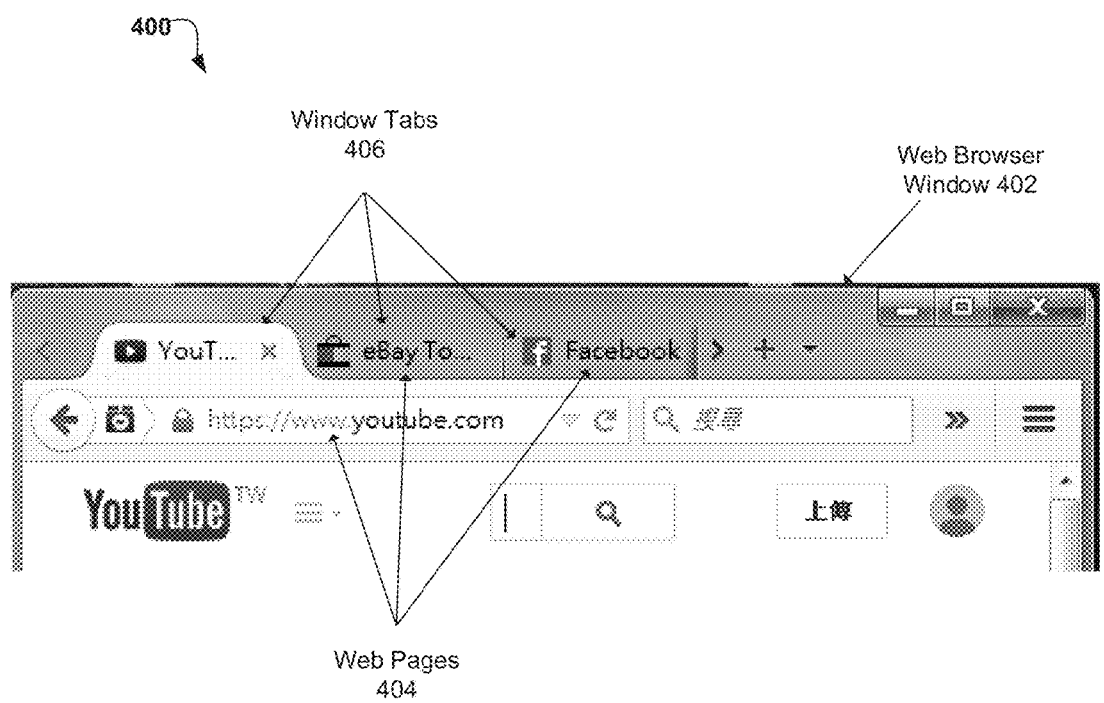
FIG. 4 illustrates an example of a web browser window according to at least one embodiment.

Referring now to FIG. 4, an example of a web browser window 400 is depicted. As previously described, a user may use a computer 102 (FIG. 1) to open a web browser window 402 and access one or more webpages 404 using window tabs 406 within the user interface of the web browser window 402. For example, a user may open a web browser window 402 such as Google® (Google and all Google-based trademarks and logos are trademarks or registered trademarks of Google and/or its affiliates). Furthermore, the web browser window 402 may load webpages 404, such as eBay®, Youtube® (Youtube and all Youtube-based trademarks and logos are trademarks or registered trademarks of Google and/or its affiliates), and Facebook® (Facebook and all Facebook-based trademarks and logos are trademarks or registered trademarks of Facebook and/or its affiliates). Additionally, according to one embodiment of the present invention, the webpages 404 may have pre-defined control components tags 202 (FIG. 2) added to the source code of each webpage 404. Thus, the taskbar shortcut control menu program 108A, 108B (FIG. 1), may identify the control component tags 202 (FIG. 2), and based on the control component tags 202 (FIG. 2), may extract the display components 306 (FIG. 3) and control components 304 (FIG. 3) to the control menus 302 (FIG. 3) for each webpage 404 to control webpage content.

Figure 5:
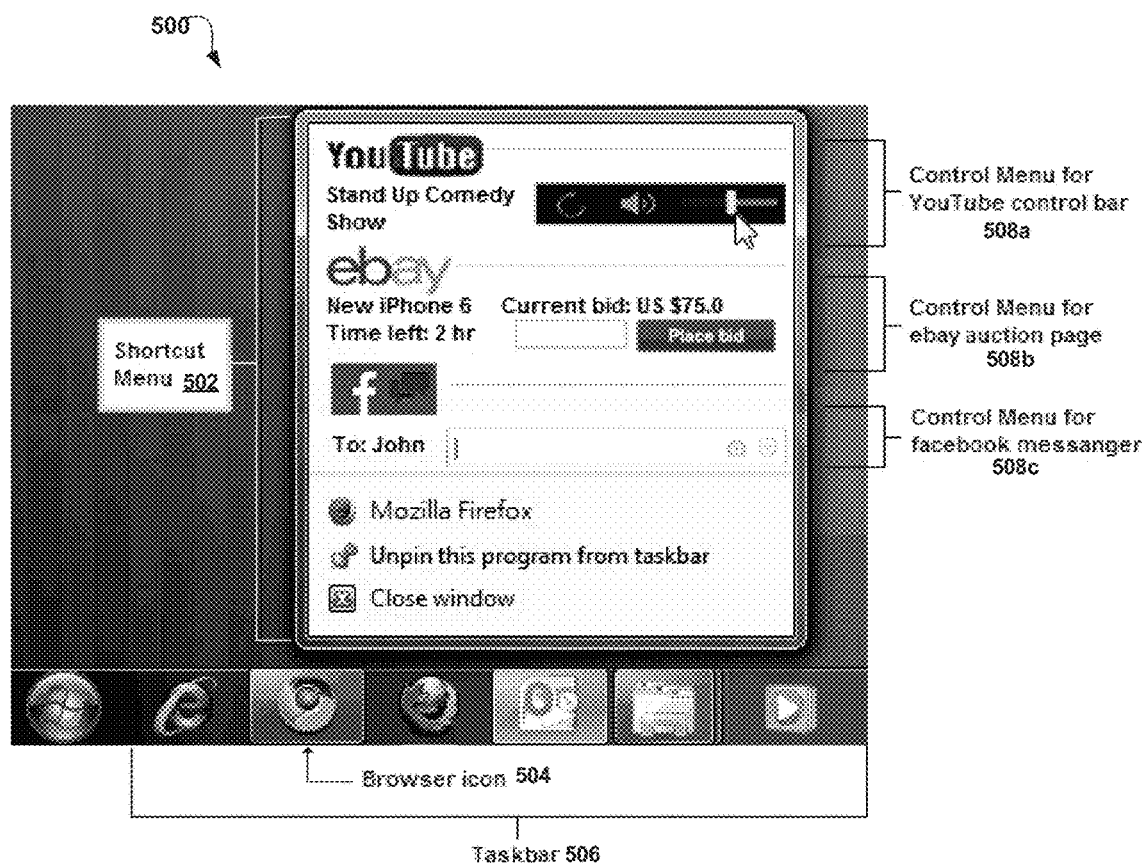
FIG. 5 illustrates an example of a taskbar shortcut control menu according to at least one embodiment.

Referring now to FIG. 5, an example of a taskbar shortcut control menu 500, according to one embodiment, is depicted. A web browser window 402 (FIG. 4) may be opened, and a corresponding browser icon 504 may be created on the taskbar 506. Thus, in response to a user right-clicking the browser icon 504, a taskbar shortcut menu 502 may be displayed. Additionally, control menus 508a, b, and c may be added to the taskbar shortcut menu 502 as more webpages 404 (FIG. 4) may be opened on the web browser window 402 (FIG. 4). For example, when webpages 404 (FIG. 4) such as Youtube®, Facebook®, and eBay® are loaded on the web browser window 402 (FIG. 4), control menus 508 corresponding to each webpage 404 (FIG. 4) may be added to the taskbar shortcut menu 502. As such, a user may control the volume of a Youtube® video using the Youtube® control menu 508a, bid on an item on eBay® using the eBay® control menu 508b, and write a Facebook® message using the Facebook® control menu 508c.

Figure 6:
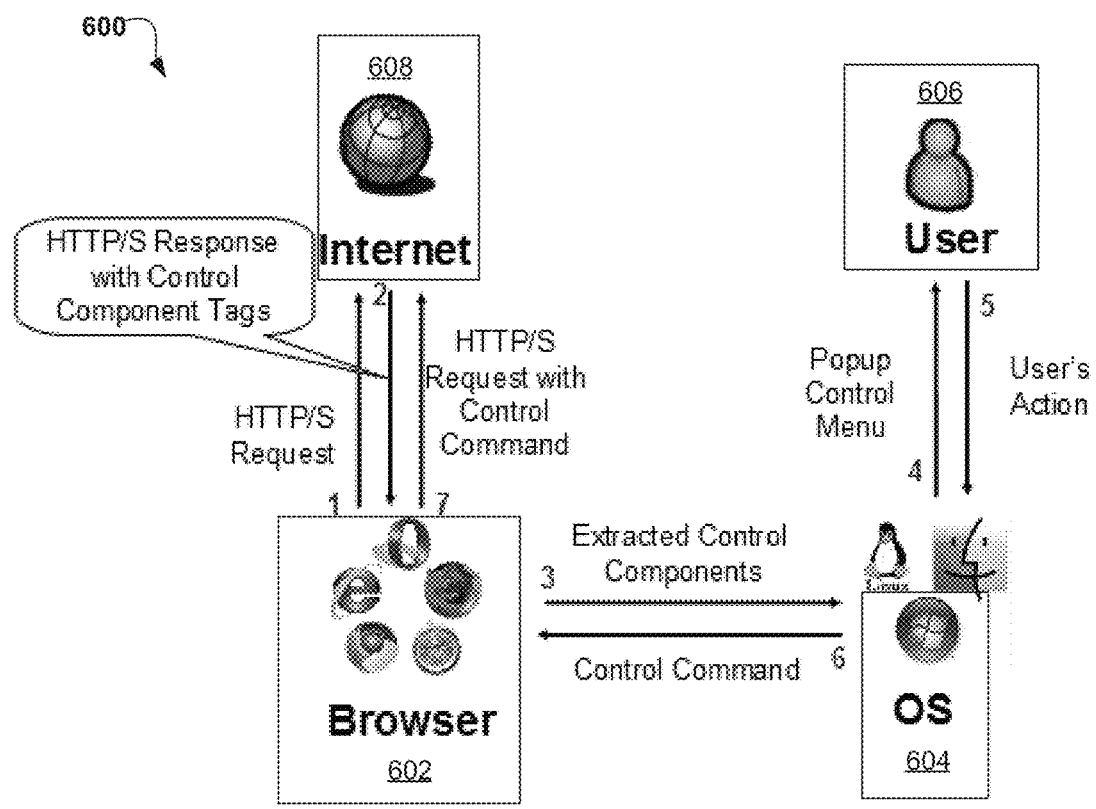
FIG. 6 illustrates a use case diagram according to one embodiment.

Referring now to FIG. 6, a use case diagram 600 in accordance with one embodiment is depicted. As previously described in FIG. 4, a user may use a computer 102 (FIG. 1) to open a web browser window 402 (FIG. 4). Additionally, a corresponding browser icon 504 (FIG. 5) may be created on the taskbar 506 (FIG. 5). Furthermore, according to one implementation, in step 1, HTTP/S requests may be sent by a browser 602 to the internet web servers 608, such as a server 112 (FIG. 1), via a communication network 110 (FIG. 1). Thereafter, in step 2, the internet web servers 608 may respond with HTTP/S responses, and may open webpages 404 (FIG. 4) having control component tags 202 (FIG. 2) in the source code of the webpages 404 (FIG. 4). Therefore, in step 3, based on the control component tags 202 (FIG. 2) in the source code of the webpages 404 (FIG. 4), the taskbar shortcut control menu program 108A, 108B (FIG. 1) may identify and extract control components 304 (FIG. 3) and display components 306 (FIG. 3) from the webpages 404 (FIG. 4) in the browser 602 to the operating system 604. As such, in response to a user 606 right-clicking on a browser icon 504 (FIG. 5), the taskbar shortcut control menu program 108A, 108B (FIG. 1) may display a taskbar shortcut menu 502 (FIG. 5) with control menus 508a, b, and c (FIG. 5) for each webpage 404 (FIG. 4) in step 4. Thus, in step 5, the taskbar shortcut control menu program 108A, 108B (FIG. 1) may detect a user's actions on the control components 304 (FIG. 3) of the control menus 508a, b, and c (FIG. 5). Then, the taskbar shortcut control menu program 108A, 108B (FIG. 1) may forward a control command from the operating system 604 to the browser 602 in step 6. In step 7, the browser 602 may send HTTP/S request with the control commands to the internet web servers 608 to complete the user's action. The implementation for the taskbar shortcut control menu program 108A, 108B (FIG. 1) is described in more detail below with respect to FIG. 7, according to one embodiment.

Figure 7:
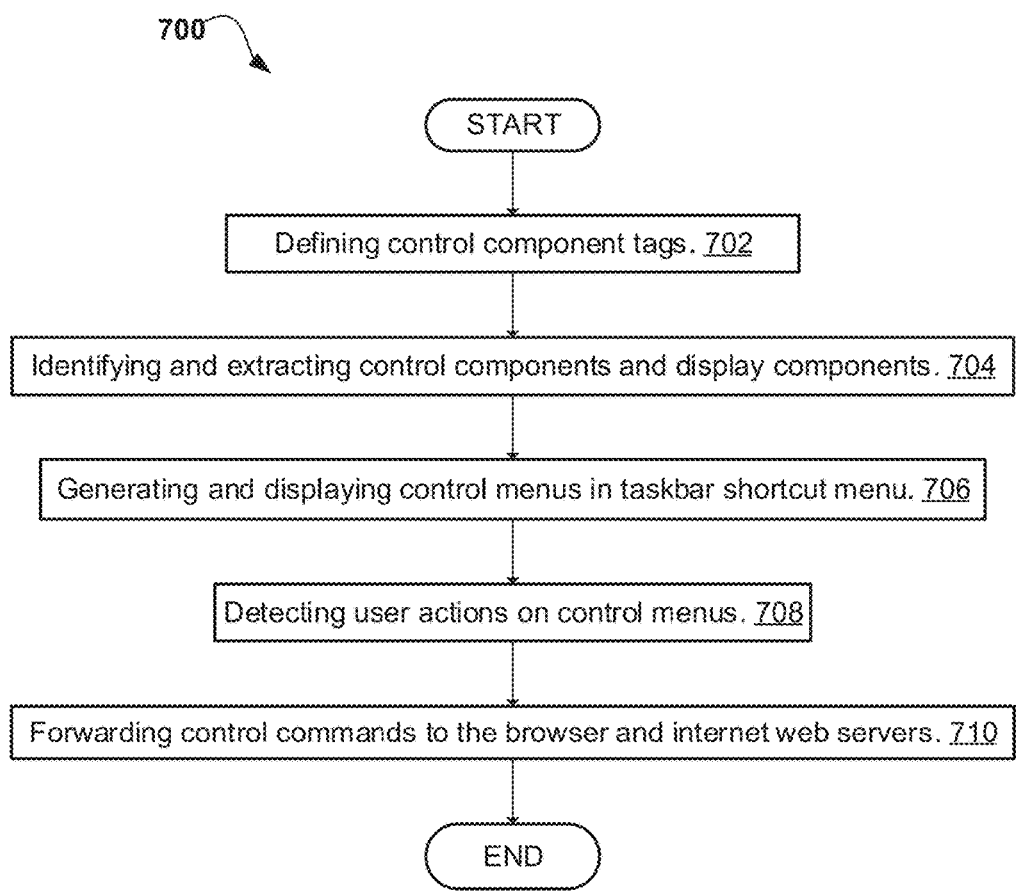
FIG. 7 is an operational flowchart illustrating the steps carried out by a program for providing a taskbar shortcut menu having control menus to control webpage content according to one embodiment.

Referring now to FIG. 7, an operational flowchart 700 illustrating the steps carried out by a program for providing a taskbar shortcut menu having control menus to control webpage content is depicted. At 702, the taskbar shortcut control menu program 108A, 108B (FIG. 1) may define control component tags 202 (FIG. 2) in the source code of webpages 404 (FIG. 4). As previously described in FIG. 2, the control component tags 202 (FIG. 2) may be used to define which control components 304 (FIG. 3) and display components 306 (FIG. 3) of webpages 404 (FIG. 4) may be added to webpage control menus 508a, b, and c (FIG. 5) on the taskbar shortcut menu 502 (FIG. 5). For example, the control component tags 202 (FIG. 2), such as <browser shortcut menu>, may be added to the source code of a webpages 404 (FIG. 4), such as eBay®. Furthermore, according to at least one implementation, the control component tags 202 (FIG. 2) may define display components 306 (FIG. 3) of the eBay® webpage, such as the eBay® logo and item information, and control components 304 (FIG. 3), such as a place bid option to allow a user to bid on items.

Then, at 704, the taskbar shortcut control menu program 108A, 108B (FIG. 1) may identify and extract the control components 304 (FIG. 3) and display components 306 (FIG. 3) from the webpages 404 (FIG. 4). As previously described in FIG. 4, a user may use a computer 102 (FIG. 1) to open a web browser window 402 (FIG. 4) and type in a web address. For example, a user may type the web address www.ebay.com on the web browser window 402 (FIG. 4) and select an item on eBay®. Therefore, the taskbar shortcut control menu program 108A, 108B (FIG. 1) may identify the control component tags 202 (FIG. 2) defined in the source code of the eBay® item webpage 404 (FIG. 4). Furthermore, based on the control component tags (FIG. 202), the taskbar shortcut control menu program 108A, 108B (FIG. 1) may extract the display components 306 (FIG. 3), such as the eBay® logo and the item information, and control components 304 (FIG. 3), such as a place bid option, from the eBay® item webpage 404 (FIG. 4) to add and display in the eBay® control menu 302 (FIG. 3).

Next, at 706, the taskbar shortcut control menu program 108A, 108B (FIG. 1) may generate and display control menus 508a, b, and c (FIG. 5) in a taskbar shortcut menu 502 (FIG. 5). As previously described in FIG. 5, a browser window 402 (FIG. 4) may be opened, and a corresponding browser icon 504 (FIG. 5) may be created on the taskbar 506 (FIG. 5). As such, in response to a user right-clicking the browser icon 504 (FIG. 5), a taskbar shortcut menu 502 (FIG. 5) may be displayed. Therefore, based on the control components 304 (FIG. 3) and display components 306 (FIG. 3) extracted from the webpage 404 (FIG. 4), the taskbar shortcut control menu program 108A, 108B (FIG. 1) may generate a control menu 508a, b, and c (FIG. 5) for the webpages 404 (FIG. 4) on the taskbar shortcut menu 502 (FIG. 5).

Furthermore, additional webpages 404 (FIG. 4) may be added to the web browser window 402 (FIG. 4), and the taskbar shortcut control menu program 108A, 108B (FIG. 1) may generate control menus 508a, b, and c (FIG. 5) corresponding to each webpage 404 (FIG. 4) on the taskbar shortcut menu 502 (FIG. 5). For example, webpages 404 (FIG. 4) such as Youtube®, Facebook®, and eBay® may be opened on the web browser window 402 (FIG. 4). Therefore, the taskbar shortcut control menu program 108A, 108B (FIG. 1) may create control menus 508a, b, and c (FIG. 5) for the Youtube®, Facebook®, and eBay® webpages 404 (FIG. 4). Thus, the taskbar shortcut control menu program 108A, 108B (FIG. 1) may allow a user to control the volume of a Youtube® video using the Youtube® control menu 508a (FIG. 5), bid on an item on eBay® using the eBay® control menu 508b (FIG. 5), and write a Facebook® message using the Facebook® control menu 508c (FIG. 5).

Then, at 708, the taskbar shortcut control menu program 108A, 108B (FIG. 1) may detect user actions on the control menus 508a, b, and c (FIG. 5). As previously described in FIG. 5, a user may control content on one or more webpages 404 (FIG. 4) using the control menus 508a, b, and c (FIG. 5) on the taskbar shortcut menu 502 (FIG. 5). For example, a user may bid on an eBay® item using the eBay® control menu 508b (FIG. 5). Thus, the taskbar shortcut control menu program 108A, 108B (FIG. 1) may detect a user inputting $80 in the place bid box of the eBay® control menu 508b (FIG. 5) and clicking the place bid option 304 (FIG. 3).

Next, at 710, the taskbar shortcut control menu program 108A, 108B (FIG. 1) may forward control commands to the browser 602 (FIG. 6) and the internet web servers 608 (FIG. 6). As previously described in step 708, the taskbar shortcut control menu program 108A, 108B (FIG. 1) may detect user actions on the control menus 508a, b, and c (FIG. 5). Therefore, with respect to the previous example, the taskbar shortcut control menu program 108A, 108B (FIG. 1) may detect a user placing a bid on an item on the eBay® control menu 508b (FIG. 5). As such, based on the input by the user placing a bid, the taskbar shortcut control menu program 108A, 108B (FIG. 1) may forward a control command to place a bid of $80 on the eBay® item to the browser 602 (FIG. 6). Furthermore, as previously described in step 7 of FIG. 6, the browser 602 (FIG. 6) may send HTTP/S request with the control commands to the internet web servers 608 (FIG. 6) to complete the user's action of bidding on an eBay® item.

It may be appreciated that FIGS. 2-7 provide only an illustration of one implementation and does not imply any limitations with regard to how different embodiments may be implemented. Many modifications to the depicted environments may be made based on design and implementation requirements. For example, the taskbar shortcut control menu program 108A, 108B (FIG. 1) may be applied to not only different web browsers but to other software applications as well. Furthermore, the taskbar shortcut control menu program 108A, 108B (FIG. 1) may control one or more software applications in a shortcut menu for one or more desktops.

Figure 8:
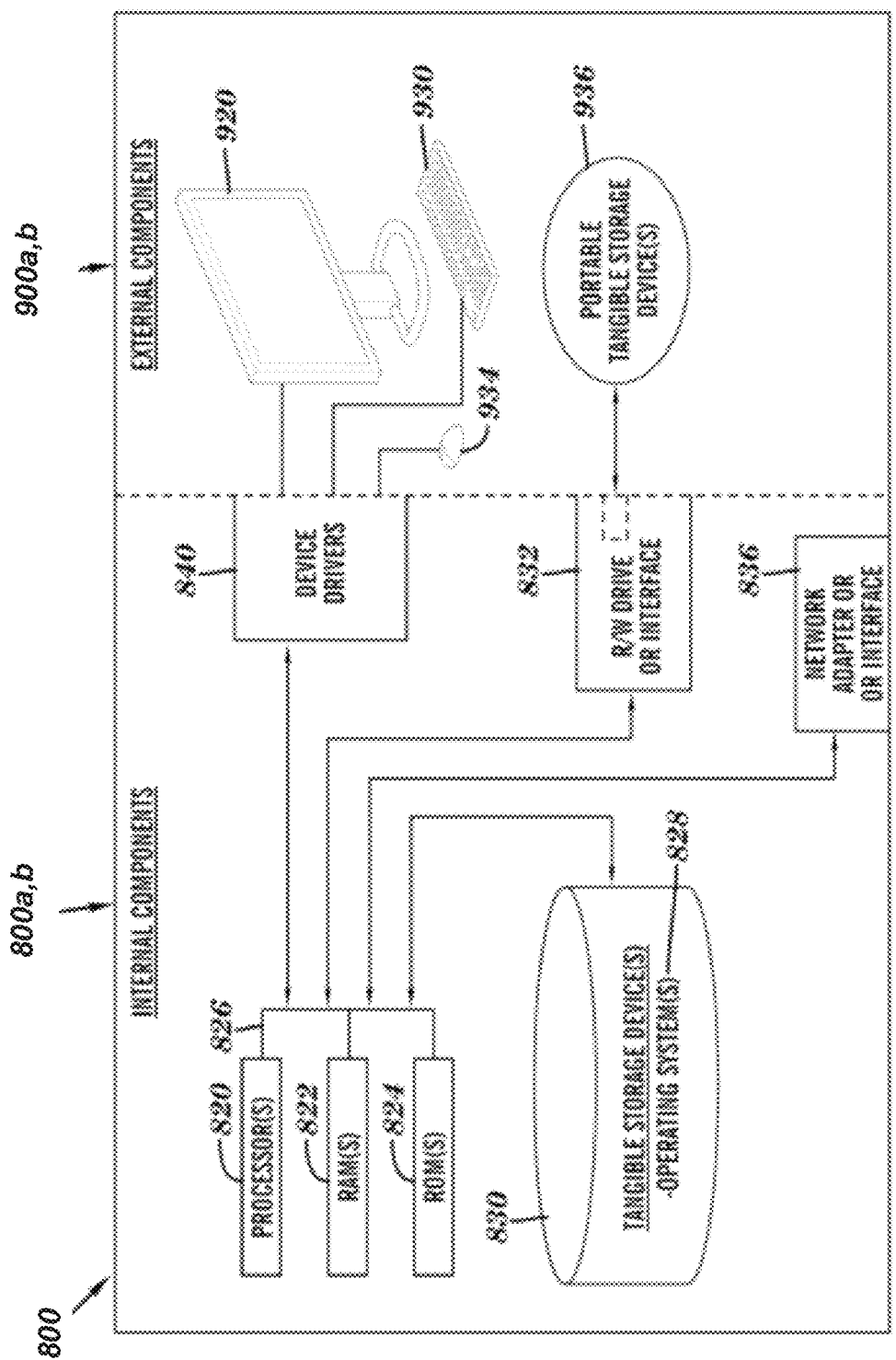
FIG. 8 is a block diagram of the system architecture of a program for controlling webpage content based on a taskbar shortcut menu according to at least one embodiment.

FIG. 8 is a block diagram of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 8. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the taskbar shortcut control menu program 108A (FIG. 1) in client computer 102 (FIG. 1), and the taskbar shortcut control menu program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as taskbar shortcut control menu program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The taskbar shortcut control menu program 108A (FIG. 1) and software program 114 (FIG. 1) in client computer 102 (FIG. 1), and taskbar shortcut control menu program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the taskbar shortcut control menu program 108A (FIG. 1) and software program 114 (FIG. 1) in client computer 102 (FIG. 1) and the taskbar shortcut control menu program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:
On-demand self-service: a cloud consumer can unilaterally provision computing capabilities, such as server time and network storage, as needed automatically without requiring human interaction with the service's provider.
Broad network access: capabilities are available over a network and accessed through standard mechanisms that promote use by heterogeneous thin or thick client platforms (e.g., mobile phones, laptops, and PDAs).
Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).
Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.
Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
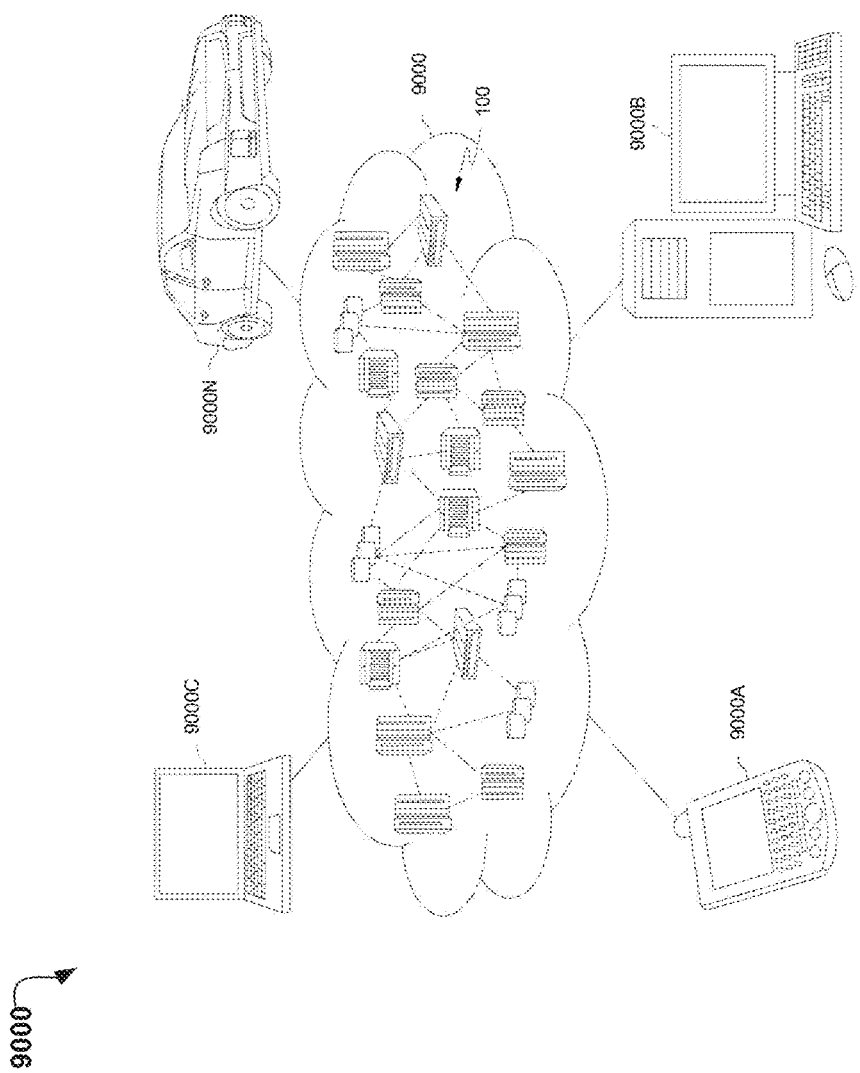
FIG. 9 is a block diagram of an illustrative cloud computing environment including the computer system depicted in FIG. 1, in accordance with an embodiment of the present disclosure.

Referring now to FIG. 9, illustrative cloud computing environment 9000 is depicted. As shown, cloud computing environment 9000 comprises one or more cloud computing nodes 100 with which local computing devices used by cloud consumers, such as, for example, personal digital assistant (PDA) or cellular telephone 9000A, desktop computer 9000B, laptop computer 9000C, and/or automobile computer system 9000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 9000 to offer infrastructure, platforms and/or software as services for which a cloud consumer does not need to maintain resources on a local computing device. It is understood that the types of computing devices 9000A-N shown in FIG. 9 are intended to be illustrative only and that computing nodes 100 and cloud computing environment 9000 can communicate with any type of computerized device over any type of network and/or network addressable connection (e.g., using a web browser).

Figure 10:
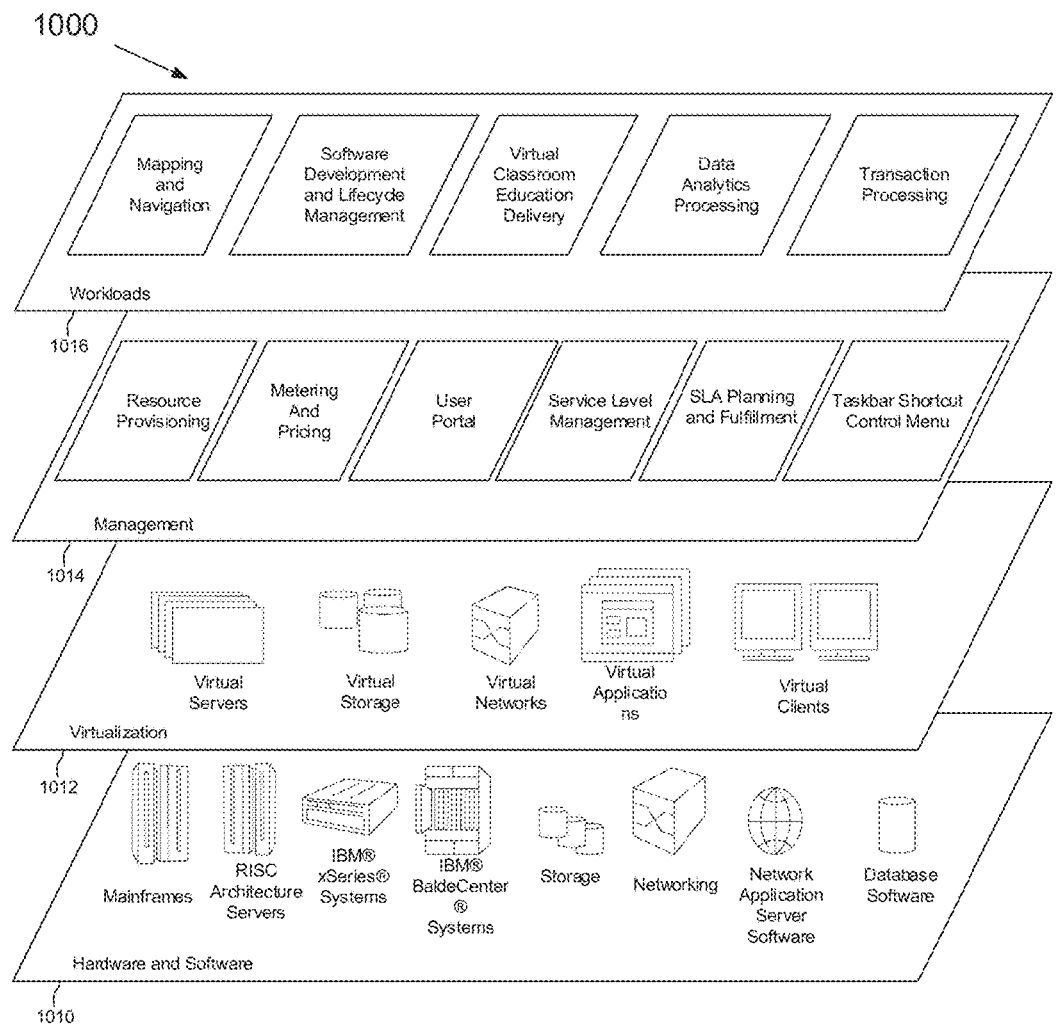
FIG. 10 is a block diagram of functional layers of the illustrative cloud computing environment of FIG. 9, in accordance with an embodiment of the present disclosure.

Referring now to FIG. 10, a set of functional abstraction layers 1000 provided by cloud computing environment 9000 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1010 includes hardware and software components. Examples of hardware components include: mainframes; RISC (Reduced Instruction Set Computer) architecture based servers; storage devices; networks and networking components. In some embodiments, software components include network application server software.

Virtualization layer 1012 provides an abstraction layer from which the following examples of virtual entities may be provided: virtual servers; virtual storage; virtual networks, including virtual private networks; virtual applications and operating systems; and virtual clients.

In one example, management layer 1014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Taskbar Shortcut Control Menu program may manage one or more personas to facilitate the user in recalling challenge question transformations.

Workloads layer 1016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling a plurality of application content on a single web browser based on a taskbar shortcut menu associated with the single web browser, the method comprising:

defining a plurality of control component tags in a plurality of applications associated with the single web browser, wherein the plurality of applications are webpages currently executing on the single web browser;

automatically identifying a first portion for each application associated with the plurality of applications based on the plurality of defined control component tags, wherein the first portion comprises display components that are identical to one or more display components represented on one of the webpages;

automatically identifying a second portion for each application associated with the plurality of applications based on the plurality of defined control component tags, wherein the second portion comprises control components that are identical to one or more control components represented on one of the webpages;

extracting each identified first portion from each application associated with the plurality of applications and each identified second portion from each application associated with the plurality of applications;

generating a plurality of control menus, and adding each identified and extracted first portion and each identified and extracted second portion to a corresponding control menu associated with the plurality of control menus;

generating the taskbar shortcut menu and integrating the generated plurality of control menus on the taskbar shortcut menu based on the plurality of defined control component tags, wherein one or more of the generated and integrated plurality of control menus controls content on a webpage associated with the plurality of applications and enables a user to enter text on one or more of the generated and integrated plurality of control menus based on a first text box that is derived from and connected to a corresponding text box on one of the webpages, and wherein the taskbar shortcut menu comprises a single interface menu, wherein integrating the generated plurality of control menus comprises consolidating the generated plurality of control menus that corresponds to a web browser icon associated with the single web browser by consolidating the display components and the control components associated with each of the control menus onto the single interface menu, and wherein each of the generated plurality of control menus correspond to a different webpage associated with the single web browser;

displaying the taskbar shortcut menu comprising each of the generated and integrated plurality of control menus for each application associated with the plurality of applications, wherein the displaying is responsive to detecting a first user action; and detecting at least one second user action on at least one second portion associated with an identified and extracted second portion of the generated and integrated plurality of control menus, wherein the detecting at least one second user action comprises detecting a user using the second portion to control content on one of the webpages and to enter text based on the first text box associated with one of the webpages, wherein the at least one second user action on the second portion is forwarded to the single web browser.

2. The method of claim 1, wherein the control component tags define at least one display component and at least one control component on the webpages.

3. The method of claim 1, wherein the identified and extracted first portion comprises display components, and the identified and extracted second portion comprises control components.

4. The method of claim 1, wherein each of the plurality of control menus control at least one of the plurality of applications.

5. The method of claim 1, wherein the detecting the first user action comprises detecting a right-click on a taskbar application icon.

6. The method of claim 1, wherein the detecting the at least one second user action comprises determining at least one of a control of sound volume on a webpage, a purchase made on a webpage, and a message sent on a webpage.

7. A computer system for controlling a plurality of application content on a single web browser based on a taskbar shortcut menu associated with the single web browser, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

defining a plurality of control component tags in a plurality of applications associated with the single web browser, wherein the plurality of applications are webpages currently executing on the single web browser;

automatically identifying a first portion for each application associated with the plurality of applications based on the plurality of defined control component tags, wherein the first portion comprises display components that are identical to one or more display components represented on one of the webpages;

automatically identifying a second portion for each application associated with the plurality of applications based on the plurality of defined control component tags, wherein the second portion comprises control components that are identical to one or more control components represented on one of the webpages;

extracting each identified first portion from each application associated with the plurality of applications and each identified second portion from each application associated with the plurality of applications;

generating a plurality of control menus, and adding each identified and extracted first portion and each identified and extracted second portion to a corresponding control menu associated with the plurality of control menus;

generating the taskbar shortcut menu and integrating the generated plurality of control menus on the taskbar shortcut menu based on the plurality of defined control component tags, wherein one or more of the generated and integrated plurality of control menus controls content on a webpage associated with the plurality of applications and enables a user to enter text on one or more of the generated and integrated plurality of control menus based on a first text box that is derived from and connected to a corresponding text box on one of the webpages, and wherein the taskbar shortcut menu comprises a single interface menu, wherein integrating the generated plurality of control menus comprises consolidating the generated plurality of control menus that corresponds to a web browser icon associated with the single web browser by consolidating the display components and the control components associated with each of the control menus onto the single interface menu, and wherein each of the generated plurality of control menus correspond to a different webpage associated with the single web browser;

displaying the taskbar shortcut menu comprising each of the generated and integrated plurality of control menus for each application associated with the plurality of applications, wherein the displaying is responsive to detecting a first user action; and detecting at least one second user action on at least one second portion associated with an identified and extracted second portion of the generated and integrated plurality of control menus, wherein the detecting at least one second user action comprises detecting a user using the second portion to control content on one of the webpages and to enter text based on the text box associated with one of the webpages, wherein the at least one second user action on the second portion is forwarded to the single web browser.

8. The computer system of claim 7, wherein the control component tags define at least one display component and at least one control component on the webpages.

9. The computer system of claim 7, wherein the identified and extracted first portion comprises display components, and the identified and extracted second portion comprises control components.

10. The computer system of claim 7, wherein each of the plurality of control menus control at least one of the plurality of applications.

11. The computer system of claim 7, wherein the detecting the first user action comprises detecting a right-click on a taskbar application icon.

12. The computer system of claim 7, wherein the detecting the at least one second user action comprises determining at least one of a control of sound volume on a webpage, a purchase made on a webpage, and a message sent on a webpage.

13. A computer program product for controlling a plurality of application content on a single web browser based on a taskbar shortcut menu associated with the single web browser, comprising:

one or more non-transitory computer-readable storage devices and program instructions stored on at least one of the one or more non-transitory computer-readable storage devices, the program instructions executable by a processor, the program instructions comprising:

program instructions to define a plurality of control component tags in a plurality of applications associated with the single web browser, wherein the plurality of applications are webpages currently executing on the single web browser;

program instructions to automatically identify a first portion for each application associated with the plurality of applications based on the plurality of defined control component tags, wherein the first portion comprises display components that are identical to one or more display components represented on one of the webpages;

program instructions to automatically identify a second portion for each application associated with the plurality of applications based on the plurality of defined control component tags, wherein the second portion comprises control components that are identical to one or more control components represented on one of the webpages;

program instructions to extract each identified first portion from each application associated with the plurality of applications and each identified second portion from each application associated with the plurality of applications;

program instructions to generate a plurality of control menus, and adding each identified and extracted first portion and each identified extracted second portion to a corresponding control menu associated with the plurality of control menus;

program instructions to generate the taskbar shortcut menu and integrating the generated plurality of control menus on the taskbar shortcut menu based on the plurality of defined control component tags, wherein one or more of the generated and integrated plurality of control menus controls content on a webpage associated with the plurality of applications and enables a user to enter text on one or more of the generated and integrated plurality of control menus based on a first text box that is derived from and connected to a corresponding text box on one of the webpages, and wherein the taskbar shortcut menu comprises a single interface menu, wherein the program instructions to integrate the generated plurality of control menus comprises consolidating the generated plurality of control menus that corresponds to a web browser icon associated with the single web browser by consolidating the display components and the control components associated with each of the control menus onto the single interface menu, and wherein each of the generated plurality of control menus correspond to a different webpage associated with the single web browser;

program instructions to display the taskbar shortcut menu comprising each of the generated and integrated plurality of control menus for each application associated with the plurality of applications, wherein the displaying is responsive to detecting a first user action; and program instructions to detect at least one second user action on at least one second portion associated with an identified and extracted second portion of the generated and integrated plurality of control menus, wherein the detecting at least one second user action comprises detecting a user using the second portion to control content on one of the webpages and to enter text based on the text box associated with one of the webpages, wherein the at least one second user action on the second portion is forwarded to the single web browser.

14. The computer program product of claim 13, wherein the identified and extracted first portion comprises display components, and the identified and extracted second portion comprises control components.

15. The computer program product of claim 13, wherein each of the plurality of control menus control at least one of the plurality of applications.

16. The computer program product of claim 13, wherein the program instructions to detect the first user action comprises detecting a right-click on a taskbar application icon.

17. The computer program product of claim 13, wherein the program instructions to detect the at least one second user action comprises determining at least one of a control of sound volume on a webpage, a purchase made on a webpage, and a message sent on a webpage.

\* \* \* \* \*